US010823849B2

(12) United States Patent
Liu

(10) Patent No.: US 10,823,849 B2
(45) Date of Patent: Nov. 3, 2020

(54) TRACKING-DISTANCE-MEASURING SYSTEM FOR TORSO TRACKING AND METHOD THEREOF

(71) Applicant: Quanta Computer Inc., Taoyuan (TW)

(72) Inventor: Chien-Hung Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 210 days.

(21) Appl. No.: 16/170,329

(22) Filed: Oct. 25, 2018

(65) Prior Publication Data
US 2020/0072972 A1    Mar. 5, 2020

(30) Foreign Application Priority Data

Aug. 29, 2018 (TW) .............................. 107130042 A

(51) Int. Cl.
| | | |
|---|---|---|
| *G01S 15/06* | (2006.01) | |
| *G06K 9/00* | (2006.01) | |
| *G06T 19/00* | (2011.01) | |
| *H04N 13/221* | (2018.01) | |
| *G06T 7/77* | (2017.01) | |
| *H04N 13/00* | (2018.01) | |

(52) U.S. Cl.
CPC .......... *G01S 15/06* (2013.01); *G06K 9/00362* (2013.01); *G06T 7/77* (2017.01); *G06T 19/003* (2013.01); *H04N 13/221* (2018.05); *H04N 2013/0085* (2013.01)

(58) Field of Classification Search
CPC .......... G01S 15/06; G01S 15/86; G01S 15/08; G01S 15/50; G01S 17/50; G06K 9/00362; G06K 9/4661; G06T 19/003; G06T 7/77; H04N 13/221; H04N 2013/0085
USPC ......................................................... 342/118
See application file for complete search history.

(56) References Cited

U.S. PATENT DOCUMENTS

| | | | | |
|---|---|---|---|---|
| 7,522,747 | B2 * | 4/2009 | Horibe ..................... | B60R 1/00 342/118 |
| 9,618,602 | B2 * | 4/2017 | Bridges ................... | G01S 17/66 |
| 9,744,670 | B2 * | 8/2017 | Romanov ............. | B25J 9/1697 |
| 2004/0046885 | A1 * | 3/2004 | Regan ................ | H04N 5/23293 348/333.11 |
| 2005/0232491 | A1 * | 10/2005 | Chang .................. | G06K 9/4642 382/199 |

(Continued)

*Primary Examiner* — Frank J McGue
(74) *Attorney, Agent, or Firm* — McClure, Qualey & Rodack, LLP

(57) ABSTRACT

A tracking-distance-measuring system capable of tracking a torso object is provided. The tracking-distance-measuring system includes: an image sensor, a controller, a distance-measuring device, and an actuator device. The image sensor is configured to capture an input image. The controller is configured to analyze the input image to recognize a torso object from the input image, and calculate an offset distance between a center of the torso object and a central axis of the input image. The actuator device is configured to carry the distance-measuring device. The controller controls the actuator device to calibrate an offset angle between the distance-measuring device and the recognized torso object according to the offset distance. In response to calibrating the offset angle, the distance-measuring device emits energy and receives reflected energy to detect an object distance of the torso object.

8 Claims, 6 Drawing Sheets

(56) References Cited

U.S. PATENT DOCUMENTS

2010/0303300 A1* 12/2010 Svanholm .............. G01C 15/00
                                                    382/106
2018/0220973 A1* 8/2018 Asianto ................... A61B 5/11

* cited by examiner

TRACKING-DISTANCE-MEASURING SYSTEM FOR TORSO TRACKING AND METHOD THEREOF

CROSS REFERENCE TO RELATED APPLICATIONS

This Application claims priority of Taiwan Patent Application No. 107130042, filed on Aug. 29, 2018, the entirety of which is incorporated by reference herein.

BACKGROUND OF THE INVENTION

Field of the Invention

The present invention relates to distance-measuring apparatuses, and, in particular, to a tracking-distance-measuring system and method thereof for torso tracking.

Description of the Related Art

The ultrasonic applications performed by distance-measuring apparatuses currently on the market use universal distance tracking. Pets and toys in the vicinity of the distance-measuring apparatus may be detected by the ultrasonic equipment, resulting in erroneous measurements made by the distance-measuring apparatus of the distance to the target object. However, if a three-dimensional (3D) camera is integrated into the distance-measuring apparatus to measure the distance to a target object, a lot of computation resources and more power are required. As a result, a higher battery capacity is required for the distance-measuring apparatus, the size of the distance-measuring apparatus cannot be reduced, and the motor installed in the distance-measuring apparatus has to carry a heavier load.

Accordingly, how to overcome the aforementioned problem and reduce the dependence of the distance-measuring apparatus on computing performance has become an important issue.

BRIEF SUMMARY OF THE INVENTION

A detailed description is given in the following embodiments with reference to the accompanying drawings.

In an exemplary embodiment, a tracking-distance-measuring system capable of tracking a torso object is provided. The tracking-distance-measuring system includes: an image sensor, a controller, a distance-measuring device, and an actuator device. The image sensor is configured to capture an input image. The controller is configured to analyze the input image to recognize a torso object from the input image, and calculate an offset distance between a center of the torso object and a central axis of the input image. The actuator device is configured to carry the distance-measuring device. The controller controls the actuator device to calibrate an offset angle between the distance-measuring device and the recognized torso object according to the offset distance. In response to calibrating the offset angle, the distance-measuring device emits energy and receives reflected energy to detect an object distance of the torso object.

In another exemplary embodiment, a tracking-distance-measuring method capable of tracking a torso object for use in a tracking-distance-measuring system is provided. The tracking-distance-measuring system includes an image sensor, a distance-measuring device, and an actuator. The actuator device carries the distance-measuring device. The method includes the steps of: capturing an input image by the image sensor; analyzing the input image to recognize a torso object from the input image; calculating an offset distance between a center of the torso object and a central axis of the input image; controlling the actuator device to calibrate an offset angle between the distance-measuring device and the recognized torso object according to the offset distance; in response to calibrating the offset angle, utilizing the distance-measuring device to emit energy and receive reflected energy to detect an object distance of the torso object.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the disclosure and should not be taken in a limiting sense. The scope of the disclosure is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
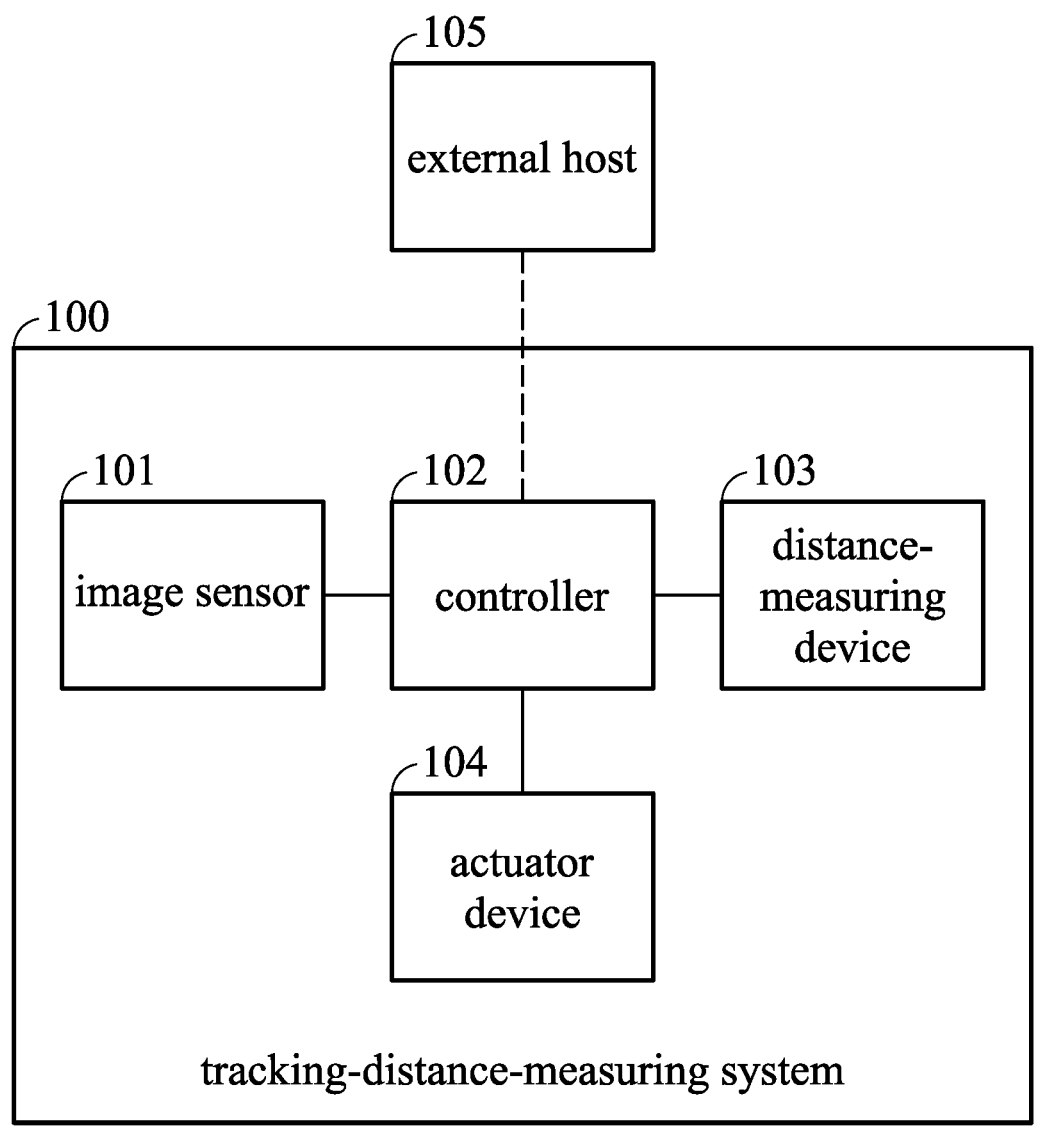
FIG. 1 is a diagram of a tracking-distance-measuring system 100 in accordance with an embodiment of the invention.

FIG. 1 is a diagram of a tracking-distance-measuring system 100 in accordance with an embodiment of the invention. The tracking-distance-measuring system 100 includes a controller 102, a distance-measuring device 103, and an actuator device 104. The tracking-distance-measuring system 100 can be coupled to an external host 105, and configured to receive a distance-detecting command from the external host 105, and transmit the detected distance information back to the external host 105. The tracking-distance-measuring system can be coupled to the external host 105 via a wired or wireless connection, but the invention is not limited thereto.

The image sensor 101 may be a charge-coupled device (CCD) sensor, or a complementary metal-oxide semiconductor (CMOS) sensor, configured to capture one or more input images. The controller 102 may be a microcontroller unit (MCU) or an application-specific integrated circuit (ASIC), and configured to analyze the input images from the image sensor 101, and recognize a torso object of the user from the input images. The controller 102 may control the actuator device 104 to calibrate its rotation angle, such that the image sensor 101 may aim toward the center of the detected torso object. Then, the controller 102 may detect the object distance between the torso object and the tracking-distance-measuring system 100 via the distance-measuring device 103.

The distance-measuring device 103 may be an ultrasonic distance-measuring device or a laser distance-measuring device, but the invention is not limited thereto. The distance-measuring device 103 may detect the object distance by emitting energy and receive reflected energy. In the embodiment, the distance-measuring device 103 may include an ultrasonic emitter (e.g., a speaker) and an ultrasonic receiver (e.g., a microphone) that are coupled to the controller 102. The distance-measuring device 103 may emit an ultrasonic signal via the ultrasonic emitter and receive a reflected ultrasonic signal via the ultrasonic receiver, thereby detecting the object distance. For example, the ultrasonic emitter may emit an ultrasonic signal having a fixed frequency such as 40 KHz, 56 KHz, or 60 KHz, but the invention is not limited thereto. The controller 102 may control the ultrasonic emitter to continuously emit an ultrasonic signal have a pattern of "101010", and receive the ultrasonic signal having the fixed frequency via the ultrasonic receiver after the emitted ultrasonic signal is reflected by an obstacle.

The actuator device 104 may be a device such as a stepping motor or a mechanic arm, and is coupled to the controller 102. The actuator device 104 is configured to carry the distance-measuring device 103 and the image sensor 101. The controller 102 may control the actuator device 104 to move or rotate the distance-measuring device 103 and the image sensor 101, thereby achieving the effect of tracking the torso object. In the embodiment, the actuator device 104 may be a direct-current (DC) stepping motor, but the invention is not limited thereto.

Figure 2:
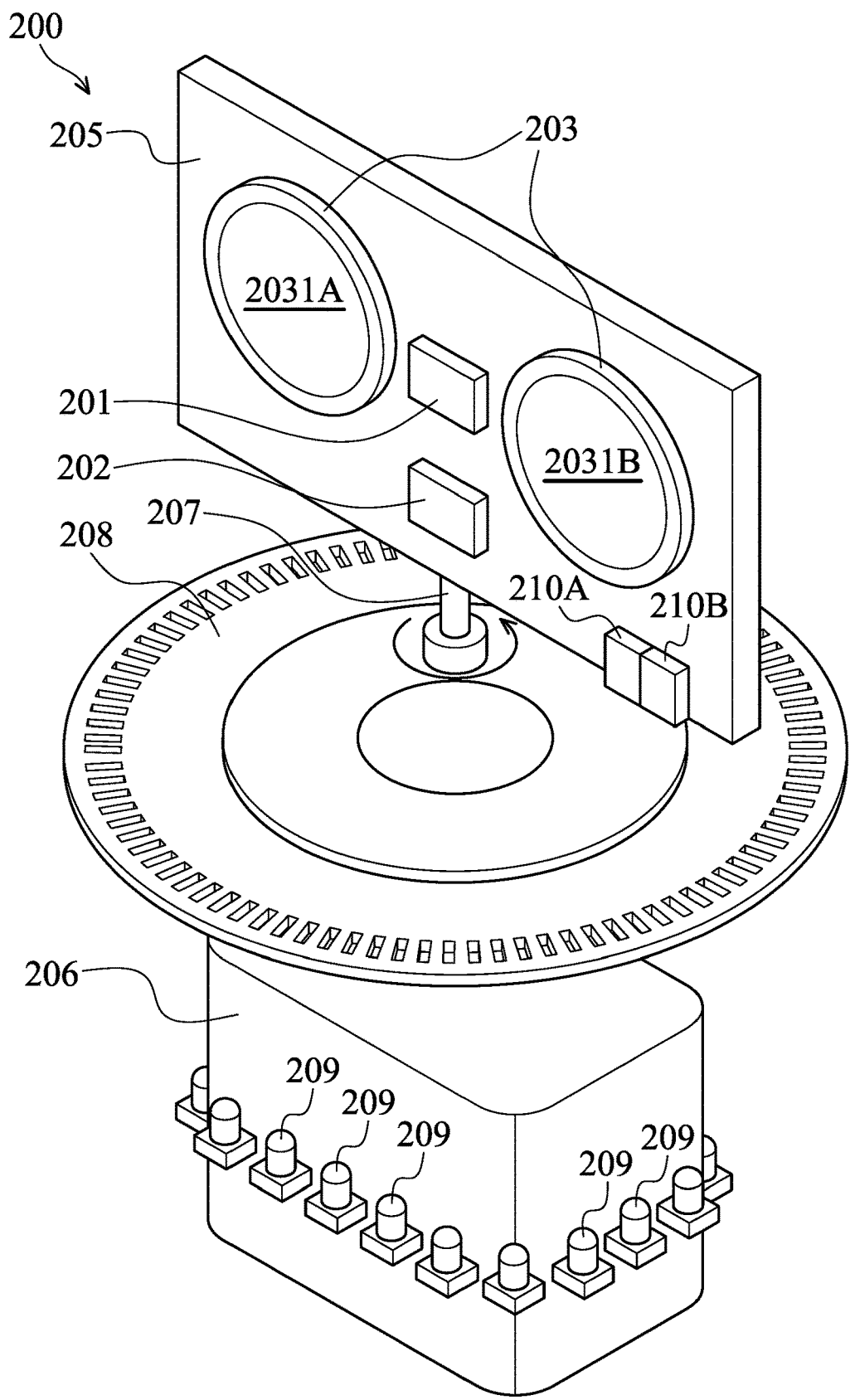
FIG. 2 is a diagram of a tracking-distance-measuring system 200 in accordance with an embodiment of the invention

FIG. 2 is a diagram of a tracking-distance-measuring system 200 in accordance with an embodiment of the invention. The tracking-distance-measuring system 200 in FIG. 2 is an example of the tracking-distance-measuring system in FIG. 1. In an embodiment, the image sensor 201, controller 202, and distance-measuring device 203 in the tracking-distance-measuring system 200 can be disposed on the same printed circuit board 205. The distance-measuring device 203 includes an ultrasonic emitter 2031A and an ultrasonic receiver 2031B. The image sensor 201 is disposed at an intermediate position between the ultrasonic emitter 2031A and the ultrasonic receiver 2031B, and configured to reduce the offset between the center of the input image captured by the image sensor and the position aimed by the distance-measuring device 203. The stepping motor 206 may be a DC stepping motor that can be used as an actuator device to carry the printed circuit board 205 via the a rotating shaft 207, such that the printed circuit board 205 may rotate 360 degrees. The controller 202 may control the rotation of the stepping motor 206 to track the torso object. The tracking-distance-measuring system 200 can be coupled to an external host (not shown), receive a distance-detecting command from the external host, and transmit the detected object distance back to the external host. Details of the method for tracking the torso object and detecting the object distance by the controller 202 will be described later.

The ultrasonic emitter 2031A may emit an ultrasonic signal, and the ultrasonic receiver 2031B may receive the reflected ultrasonic signal to detect the object distance. For example, the ultrasonic emitter 2031A may emit an ultrasonic signal having a fixed frequency such as 40 KHz, 56 KHz, or 60 KHz, but the invention is not limited thereto. The controller 102 may control the ultrasonic emitter 2031A to continuously emit an ultrasonic signal have an "101010" pattern, and receive the ultrasonic signal having the fixed frequency by the ultrasonic receiver 2031B after the emitted ultrasonic signal is reflected by an obstacle.

In the embodiment, a counting-code wheel 208 is disposed between the stepping motor 206 and the distance-measuring device 203 to calibrate the rotation angle of the stepping motor 206. In addition, a plurality of light sources 209 are disposed around the stepping motor 206. For example, the light sources 209 may be light-emitting diodes capable of emitting light toward the distance-measuring device 203 from bottom to top. In addition, light sensors 210A and 210B that are electrically connected to the controller are disposed on the printed circuit board 205 to receive the light emitted from the light sources 209.

Figure 3:
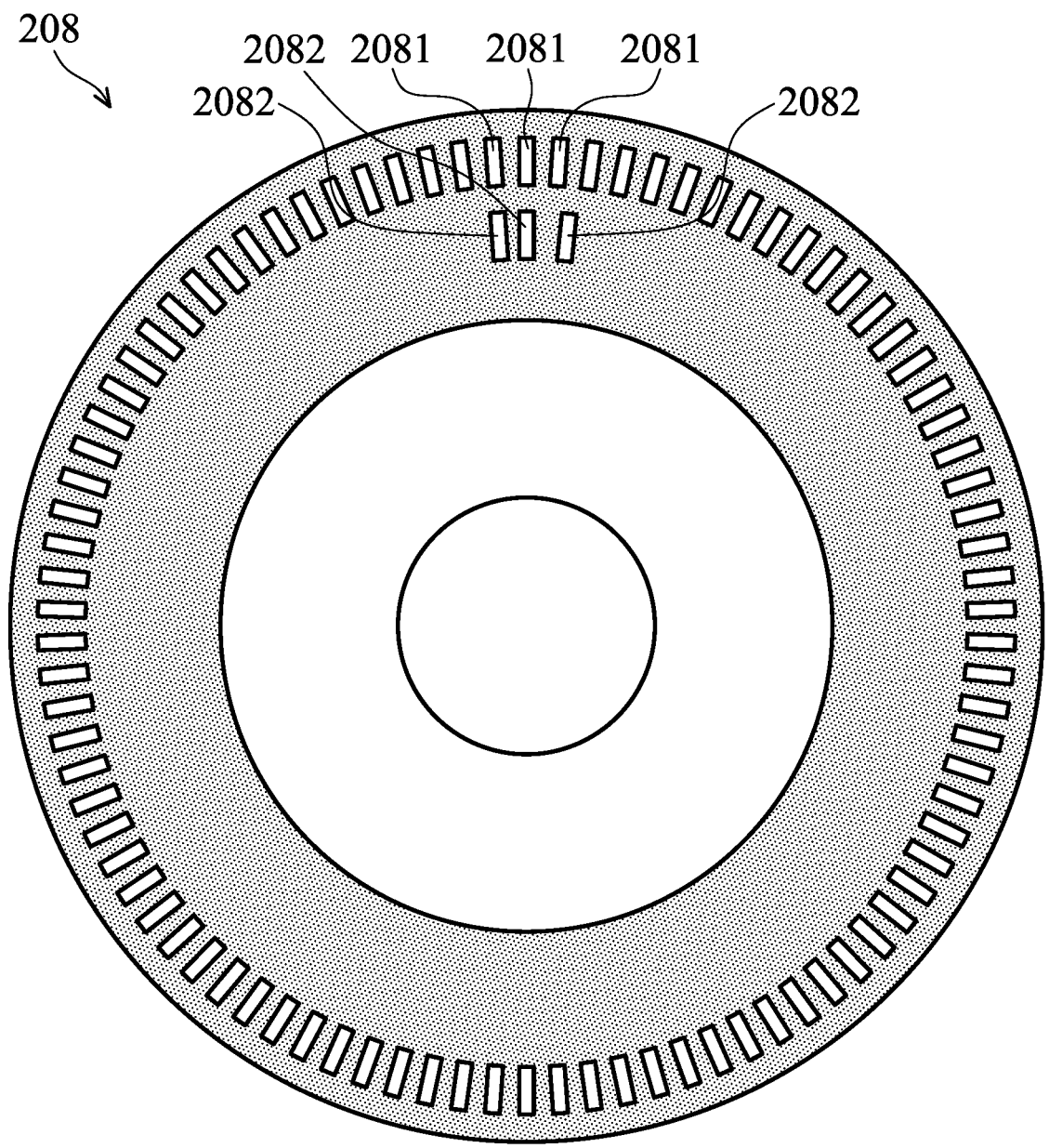
FIG. 3 is a top view of the counting-code wheel in accordance with an embodiment of the invention.

A top view of the counting-code wheel 208 is shown in FIG. 3, and the counting-code wheel 208 comprises a plurality of first light holes 2081 and a plurality of second light holes 2082. The first light holes 2081 can be regarded as step-counting holes, and are evenly disposed on a first outer circle of the counting-code wheel 208. There is a predetermined angle between every two neighboring first light holes 2081, such as 5 or 10 degrees depending on the number of first light holes 2081, but the invention is not limited thereto. The second light holes 2082 can be regarded as zero-correction holes that are disposed on a second outer circle of the counting-code wheel 208, wherein the diameter of the second outer circle is shorter than that of the first outer circle. Each of the second light holes 2082 corresponds to the position corresponding to one of the first light holes 2081 or a gap between two neighboring first light holes 2081. In addition, the second light holes 2082 are arranged in a predetermined pattern, as shown in FIG. 3. The light sensors 210A and 210B are capable of receiving the light that is emitted from the light sources 209 and respectively passes through one of the first light holes 2081 and second light hole 2082.

Specifically, the light emitted from the light sources 209 disposed around the stepping motor 206 and passing through one of the first light holes 2081 is received by the light sensor 210B. The light emitted from the light sources 209 disposed around the stepping motor 206 and passing through one of the second light holes 2082 is received by the light sensor 210A. With regard to the second outer circle on which the second light holes 2082 are located, since there are several second light holes on the counting-code wheel 208, the light emitted from the light sources 209 is blocked by the counting-code wheel 208 most of time. However, with regard to the first outer circle on which the first light holes 2081 are located, the first light holes 2081 are evenly disposed on the first outer circle of the counting-code wheel 20. When the stepping motor 206 drives the printed circuit board 205 to rotate, the light emitted from the light sources 209 will pass though one of the first light holes 2081 or be blocked by the gap between two neighboring first light holes 2081 in an interleaved fashion.

Accordingly, when the stepping motor 206 drives the printed circuit board 205 to rotate, the controller 202 may determine the current rotation angle of the stepping motor 206 according to variations of the light strength detected by the light sensors 210A and 210B. For example, when the light emitted from the light sources 209 passes through one of the first light holes 2081, and the stepping motor 206 drives the printed circuit board 205 to rotate in the same direction (e.g., counterclockwise direction), and then the light emitted from the light sources 209 is blocked by the gap beside one of the first light holes 2081, the controller 202 may determine that the stepping motor 206 has rotated toward the counterclockwise direction half a predetermined angle (e.g., half step). Then, when the stepping motor 206 continuously drives the printed circuit board 205 to rotate in the same direction (e.g., counterclockwise direction), and the light emitted from the light sources 209 passes through the next one of first light holes 2081, the controller 202 may determine that the stepping motor 206 has further rotated another half the predetermined angle (e.g., half step), and so forth.

It should be noted that each time when the tracking-distance-measuring system 200 starts to operate, the controller 202 has to perform rotation-angle calibration on the stepping motor 206. For example, the controller 202 may determine the current rotation angle of the stepping motor 206 according to variations of the light strength detected by the light sensors 210A and 210B. In an embodiment, the second light holes 2082 are calibration holes. Before the tracking-distance-measuring system 200 starts to operate, the controller 202 may control the stepping motor 206 to rotate, such that the light emitted from the light sources 209 may pass through one of the second light holes 2082 and be received by the light sensor 210A. That is, when the controller 202 controls the stepping motor 206 to rotate and determines that the stepping motor 206 has rotated to pass through all of the second light holes 2082, the controller 202 will control the stepping motor 206 to stop rotating and set the current rotation angle of the stepping motor 206 as a reference rotation angle (e.g., 0 degree), thereby completing the rotation-angle-calibration procedure of the stepping motor 206.

In an embodiment, the controller 202 may obtain the input images captured by the image sensor 201 and perform an area comparison between the obtained input images and multiple pieces of torso-object data pre-stored in a database (not shown in FIG. 2). For example, the multiple pieces of torso-object data pre-stored in the database may be information about the rough contours of the head and torso and their corresponding areas, and the information can be regarded as torso-object data. In the embodiment, the image sensor 201 may capture input images having a QVGA resolution of 320×240, but the invention is not limited thereto.

Specifically, the input images captured by the image sensor 201 are used for determining the areas of the torso object, and these operations have lower computation complexity. In addition, the distance-measuring device 203 may track the torso object using the aforementioned determination mechanism, and thus a very high image resolution for the input images captured by the image sensor 201 is not necessary. Accordingly, taking the power consumption of the tracking-distance-measuring system 200 into account, the input images having a lower image resolution such as the QVGA resolution can be used for calculations for tracking the torso object.

Figure 4:
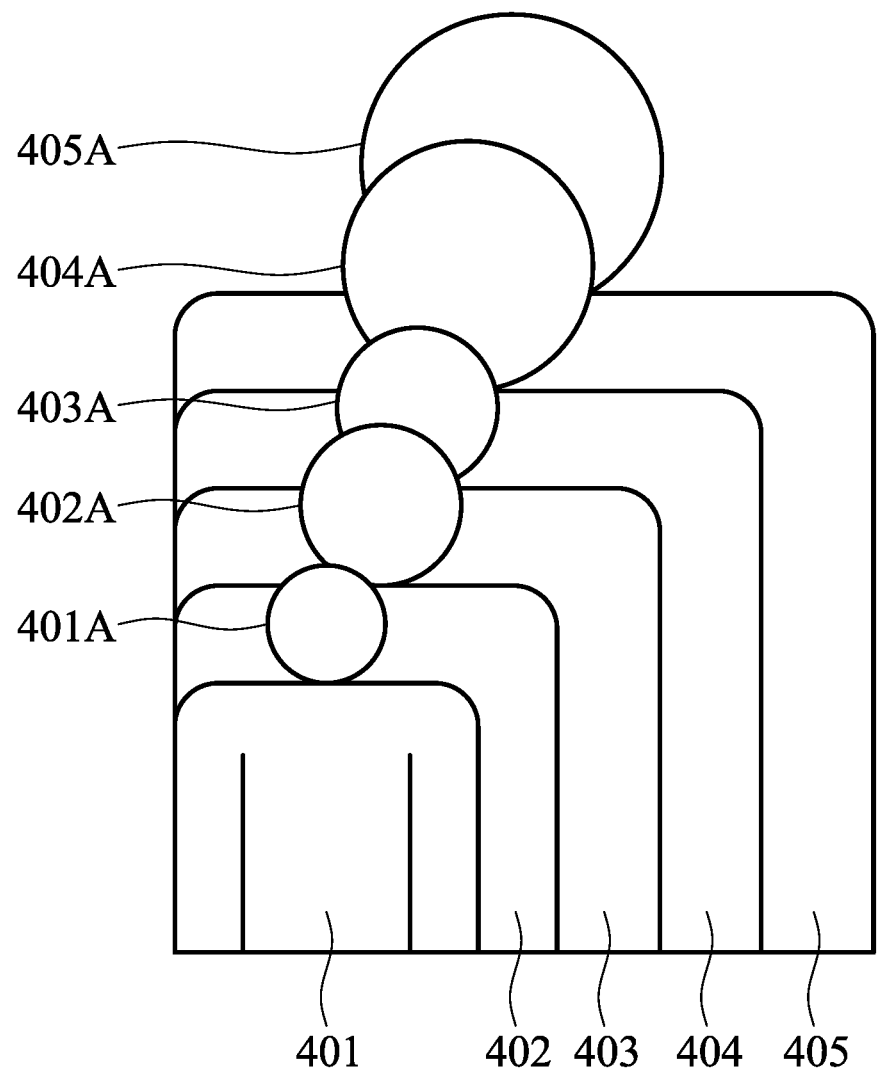
FIG. 4 is a diagram of the torso-object data in accordance with an embodiment of the invention.

In the embodiment, the multiple pieces of torso-object data pre-stored in the database can be referred to in FIG. 4. For example, the torso-object data 401 includes the torso and head 401A, and the torso-object data 402 includes the torso and head 402A, wherein the area of the torso-object data 402 is larger than that of the torso-object data 401. Similarly, it can be understood that the areas of the multiple pieces of torso-object data 401~405 are arranged in ascending order that may represent users of different sizes. It should be noted that, for purposes of description, the number of pieces of the torso-object data is 5, but the invention is not limited thereto.

Specifically, the controller 202 may analyze the input images from the image sensor 201, and recognize a torso object from the input images. Then, the controller 202 may perform an area comparison between the recognized torso object and the multiple pieces of torso-object data pre-stored in the database. If the area difference between the area of the recognized torso object and that of a specific piece of torso-object data pre-stored in the database is less than a predetermined percentage (e.g., 5%), it indicates that the area of the recognized torso object is similar to that of the specific piece of torso-object data, and the controller may calculate the horizontal coordinate value X of the central axis of the input image. It should be noted that the invention is not limited to the aforementioned percentage.

Then, the controller 202 may calculate the offset distance Xm of the central axis of the input image. For example, the controller may calculate the offset distance Xm by subtracting the calculated horizontal-coordinate value X from a half horizontal resolution (e.g., 160) of the input image. In the embodiment, Xm=160−X. The controller 202 may obtain the required steps for the stepping motor 206 by looking-up a step-rotation relationship table (not shown) using the calculated offset distance Xm, and control the stepping motor 206 to rotate the obtained steps, such that the image sensor 201 may aim toward the center of the recognized torso object.

Furthermore, after the distance-measuring device 203 aims toward the recognized torso object, the controller 202 may control the ultrasonic emitter 2031A to emit an ultrasonic signal having a fixed frequency, and start to count time. The controller 202 may wait for the reflected ultrasonic signal within a predetermined period of time (e.g., 5 or 10 seconds). If there is no reflected ultrasonic signal detected, the controller 202 may re-obtain the input images from the image sensor 201 to perform the aforementioned procedure again on the recognized torso object in the input images. If there is reflected ultrasonic signal detected, the controller 202 may amplify the received ultrasonic signal using an internal operational amplifier, and compare the amplified ultrasonic signal with a predetermined voltage Vt, and thereby determine whether the voltage of the amplified ultrasonic signal is higher than the predetermined voltage Vt. The predetermined voltage Vt may be 0.9V, but the invention is not limited thereto. If the voltage of the amplified ultrasonic signal is lower than the predetermined voltage Vt, the controller 202 may determine that the received ultrasonic signal is an invalid signal. If the voltage of the amplified ultrasonic signal is higher than or equal to the predetermined voltage Vt, the controller 202 stops counting time, and multiplies the counted time by the speed of sound (e.g., approximately 340 m/s) followed by a division by 2, thereby obtaining the object distance between the recognized torso object and the tracking-distance-measuring system 200.

Meanwhile, the controller 202 may determine whether the current calculation cycle is the first cycle. If the current calculation cycle is the first cycle, the controller 202 may repeatedly perform the aforementioned procedure to calculate another object distance, such as obtaining the updated input images from the image sensor 201 for re-analysis to calculating another object distance. If the current calculation cycle is not the first cycle, it indicates that there is a calculated object distance corresponding to each of the current calculation cycle and previous calculation cycle. Then, the controller 202 may calculate the difference value between the object distances of the current calculation cycle and previous calculation cycle, and determine whether the calculated difference value is greater than a threshold (e.g., 10 cm). If the calculated difference value is larger than the threshold, the controller 202 may re-obtain the input images from the image sensor, and perform the aforementioned procedure again. If the calculated difference value is smaller than or equal to the threshold, the controller 202 may report the calculated object distance of the current calculation cycle to the external host. For example, the external host is capable of controlling a movement portion disposed in the tracking-distance-measuring system 200 to move, such that the distance between the tracking-distance-measuring system 200 and the recognized torso object can be kept within a predetermined distance range.

Figure 5A:
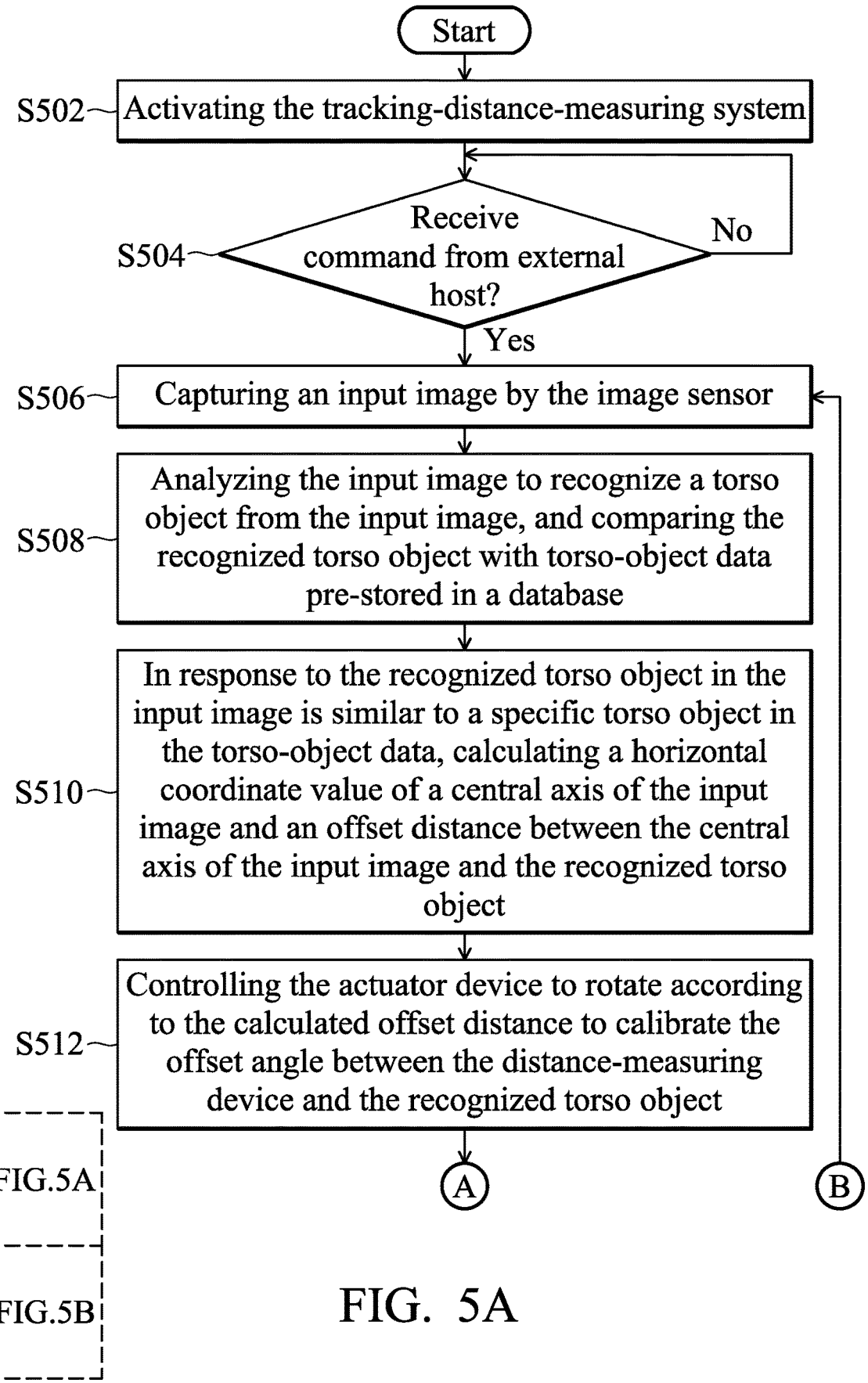
FIGS. 5A-5B are portions of a flow chart of a tracking-distance-measuring method in accordance with an embodiment of the invention.
Figure 5B:
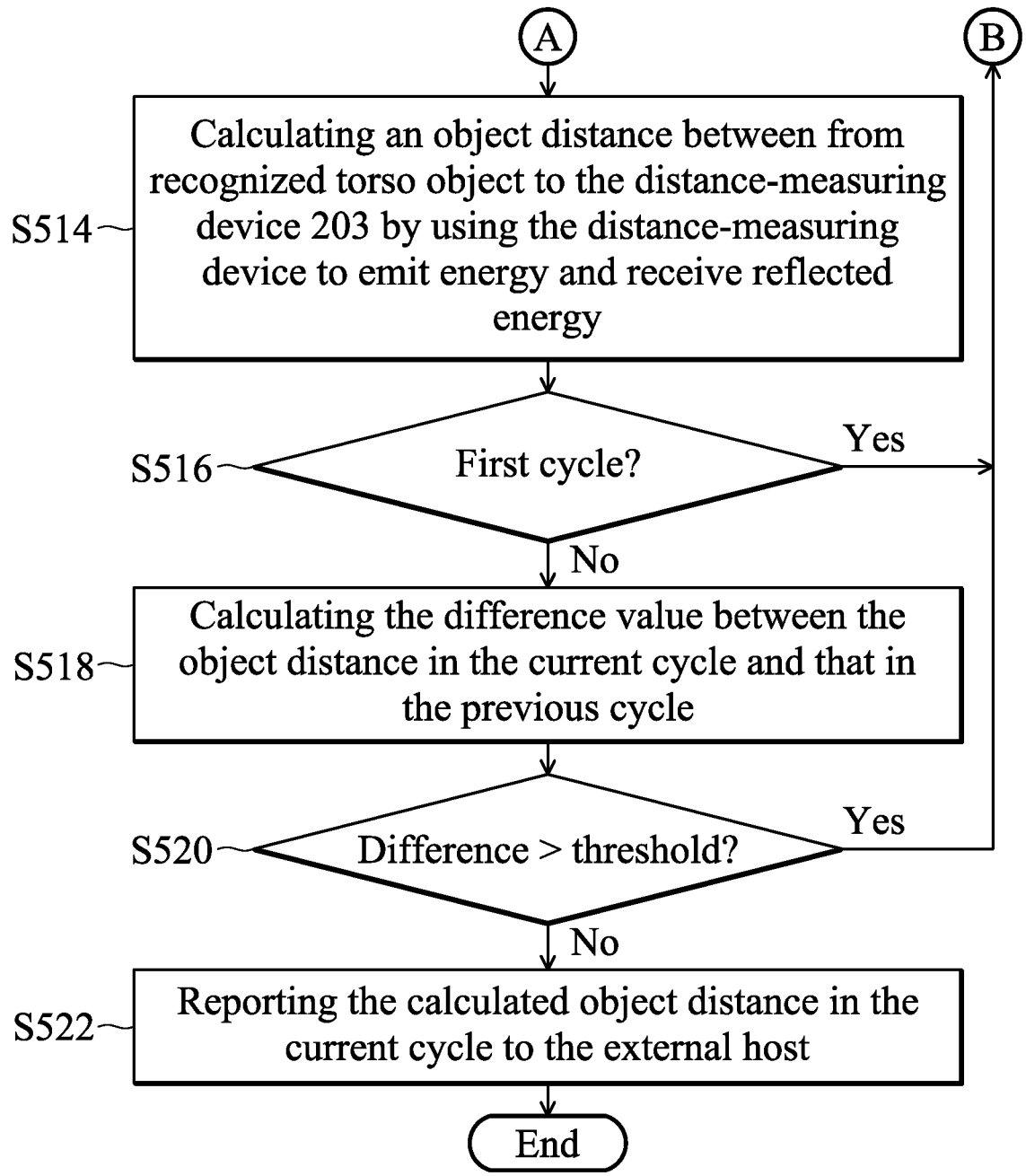

FIGS. 5A-5B are portions of a flow chart of a tracking-distance-measuring method in accordance with an embodiment of the invention. The flow shown in FIGS. 5A-5B can be performed by the tracking-distance-measuring systems 100 and 200 in FIG. 1 and FIG. 2. For example, the tracking-distance-measuring system 200 includes the image sensor 201, controller 202, distance-measuring device 203, and actuator device 204, wherein the actuator device 204 carries the distance-measuring device 203 and image sensor 201. The tracking-distance-measuring system 200 is coupled to the external host, receives a distance-measuring command from the external host, and reports the object distance to the external host.

In step S502, the tracking-distance-measuring system 200 is activated.

In step S504, it is determined by the controller 202 whether a distance-measuring command from the external host is received. If no distance-measuring command is received, step S504 is performed. If a distance-measuring command is received, step S506 is performed. For example, the distance-measuring command may be an acoustic command or a gesture command, but the invention is not limited thereto.

In step S506, an input image is captured by the image sensor 201.

In step S508, the controller 202 analyzes the input image to recognize a torso object from the input image, and compares the recognized torso object with torso-object data pre-stored in a database. For example, the torso-object data pre-stored in the database may be torso objects having different shapes (e.g., different sizes) including the torso and head.

In step S510, in response to the recognized torso object in the input image is similar to a specific torso object in the torso-object data, the controller 202 calculates a horizontal coordinate value of a central axis of the input image and an offset distance between the central axis of the input image and the recognized torso object. For example, the tracking-distance-measuring system 200 has to continuously aim toward the center of the recognized torso object so as to track the recognized torso object, and thus the controller 202 has to calculate the offset distance between the central axis of the input image and the center of the recognized object.

In step S512, the controller 202 controls the actuator device 204 to rotate according to the calculated offset distance to calibrate the offset angle between the distance-measuring device 203 and the recognized torso object. For example, the calibration of the offset angle between the distance-measuring device and the recognized torso object can be performed by aiming the central axis of the input image from the image sensor 201 toward the center of the recognized torso object.

In step S514, an object distance between from recognized torso object to the distance-measuring device 203 can be calculated by using the distance-measuring device 203 to emit energy and receive reflected energy. For example, the distance-measuring device 203 includes the ultrasonic emitter 2031A and ultrasonic receiver 2031B. The ultrasonic emitter 2031A may emit an ultrasonic signal, and the ultrasonic receiver 2031B may receive the reflected ultrasonic signal, thereby calculating the object distance.

In step S516, the controller 202 determines whether the current cycle is a first cycle. For example, in the following step S518, the difference value between the object distance in the current cycle and that in the previous cycle is required for calculation. If the current cycle is the first cycle, step S506 is performed, and the procedure from step S506 to S514 is repeatedly performed (i.e., the current cycle will become the previous cycle), thereby obtaining the object distances in the current cycle and previous cycle.

In step S518, the controller 202 calculates the difference value between the object distance in the current cycle and that in the previous cycle.

In step S520, the controller 202 determines whether the calculated difference value is greater than a threshold. If the calculated difference value is larger than the threshold, step S506 is performed. If the calculated difference value is not larger than the threshold, step S522 is performed. It should be noted that if the calculated difference value is larger than the threshold, and the procedure from step S506 to S514 is performed repeatedly. Each time when the aforementioned procedure is performed, the rotation angle of the stepping motor 206 will decrease by half a step. For example, if the aforementioned procedure is performed for the second time (i.e., repeated once), the rotation angle of the stepping motor 206 is decreased by half a step. If the aforementioned procedure is performed for the third time (i.e., repeated twice), the rotation angle of the stepping motor 206 is decreased by a step. If the aforementioned procedure is performed for the fourth time (i.e., repeated 3 times), the rotation angle of the stepping motor 206 is decreased by one and a half step, and so forth.

In step S522, the controller 202 may report the calculated object distance in the current cycle to the external host. For example, the external host is capable of controlling a movement portion disposed in the tracking-distance-measuring system 200 to move, such that the distance between the tracking-distance-measuring system 200 and the recognized torso object can be kept within a predetermined distance range.

In view of the above, a tracking-distance-measuring system and a method thereof are provided in the present invention. An image sensor is disposed in the distance-measuring device of the tracking-distance-measuring system to capture an input image of a torso object. The controller in the tracking-distance-measuring system analyzes the input image to calculate the offset angle between the central axis of the input image and the center of the torso object, thereby driving the actuator device to keep the torso object aimed at the center of the distance-measuring device. Thus, the distance-measuring device may correctly detect the object distance between the torso object and the distance-measuring device. In addition, the tracking-distance-measuring system and method thereof in the present invention may effectively reduce the dependence of computing performance, thereby achieving the effect of reducing the cost and power consumption.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A tracking-distance-measuring system capable of tracking a torso object, comprising:
   an image sensor, configured to capture an input image;
   a controller, configured to analyze the input image to recognize a torso object from the input image, and calculate an offset distance between a center of the torso object and a central axis of the input image;
   a distance-measuring device, coupled to the controller; and
   an actuator device, coupled to the controller, and configured to carry the distance-measuring device;
   wherein the controller controls the actuator device to calibrate an offset angle between the distance-measuring device and the recognized torso object according to the offset distance;
   wherein in response to calibrating the offset angle, the distance-measuring device emits energy and receives reflected energy to detect an object distance of the torso object,
   wherein the actuator device carries the image sensor, and the controller converts the offset distance into the offset angle, and controls the actuator device to rotate the distance-measuring device with the offset angle, such that the distance-measuring device aims toward the center of the torso object.

2. The tracking-distance-measuring system as claimed in claim 1, wherein the distance-measuring device comprises an ultrasonic emitter and an ultrasonic receiver,
   wherein the distance-measuring device controls the ultrasonic emitter to emit an ultrasonic signal to the torso object and controls the ultrasonic receiver to receive a reflected ultrasonic signal reflected by the torso object to calculate the object distance of the torso object.

3. The tracking-distance-measuring system as claimed in claim 1, wherein the controller compares the torso object with a plurality of pieces of torso-object data pre-stored in a database,
   wherein in response to the torso object being similar to a specific torso object in the plurality of pieces of torso-object data, the controller calculates a horizontal coordinate value for the central axis of the input image and calculates the offset distance between the central axis of the input image and the torso object.

4. The tracking-distance-measuring system as claimed in claim 1, wherein in response to the distance-measuring device having detected the object distance and the controller determining that a current cycle is a first cycle, the controller obtains an updated input image from the image sensor for analysis, calibrates the offset angle between the distance-measuring device and the torso object according to the updated input image, and calculates a difference value between the object distance in the current cycle and that in a previous cycle,
   wherein in response to the difference value being greater than a threshold, the controller re-analyzes another updated input image from the image sensor to obtain another offset angle, and controls the actuator device to rotate the distance-measuring device according to the other offset angle minus half of the predetermined angle.

5. A tracking-distance-measuring method, for use in a tracking-distance-measuring system, wherein the tracking-distance-measuring system comprises an image sensor, a distance-measuring device, and an actuator device, and the actuator device carries the distance-measuring device, the method comprising:
   capturing an input image using the image sensor;
   analyzing the input image to recognize a torso object from the input image;
   calculating an offset distance between a center of the torso object and a central axis of the input image;
   converting the offset distance into an offset angle between the distance-measuring device and the recognized torso object;
   controlling the actuator device to rotate the distance-measuring device with the offset angle, such that the distance-measuring device aims toward the center of the torso object; and
   in response to calibrating the offset angle, utilizing the distance-measuring device to emit energy and receive reflected energy to detect an object distance of the torso object.

6. The tracking-distance-measuring method as claimed in claim 5, wherein the distance-measuring device comprises an ultrasonic emitter and an ultrasonic receiver, and the method further comprises:
   controlling the ultrasonic emitter to emit an ultrasonic signal to the torso object and controlling the ultrasonic receiver to receive a reflected ultrasonic signal reflected by the torso object to calculate the object distance of the torso object.

7. The tracking-distance-measuring method as claimed in claim 5, further comprising:
   comparing the torso object with a plurality of pieces of torso-object data pre-stored in a database;
   in response to the torso object being similar to a specific torso object in the plurality of pieces of torso-object data, calculating a horizontal coordinate value of the central axis of the input image; and
   calculating the offset distance between the central axis of the input image and the torso object.

8. The tracking-distance-measuring method as claimed in claim 5, further comprising:
   in response to the distance-measuring device having detected the object distance and determining that a current cycle is the first cycle, obtaining an updated input image from the image sensor for analysis;
   calibrating the offset angle between the distance-measuring device and the torso object according to the updated input image;
   calculating a difference value between the object distance in the current cycle and that in a previous cycle; and
   in response to the difference value being greater than a threshold, re-analyzing another updated input image from the image sensor to obtain another offset angle, and controlling the actuator device to rotate the distance-measuring device according to the other offset angle minus half of the predetermined angle.

* * * * *